United States Patent [19]

Kremers et al.

[11] Patent Number: 4,596,919
[45] Date of Patent: Jun. 24, 1986

[54] THREE-DIMENSIONAL IMAGING DEVICE

[75] Inventors: Jan H. Kremers, Boulder Creek; Norman A. Peppers, Belmont; Ronald A. Cain, Scotts Valley; Jeffrey L. De Curtins, Menlo Park, all of Calif.

[73] Assignee: SRI International, Menlo Park, Calif.

[21] Appl. No.: 644,311

[22] Filed: Aug. 23, 1984

[51] Int. Cl.$^4$ .............................................. B23K 9/12
[52] U.S. Cl. .............................. 219/124.34; 318/577; 356/379
[58] Field of Search ...................... 219/124.34, 130.01; 356/376, 379, 380, 387; 382/19, 22, 25, 48; 358/101; 318/577

[56] References Cited

U.S. PATENT DOCUMENTS 4,491,715  1/1985  Voronin et al. ................. 219/124.34
4,493,968  1/1985  Brown ............................. 219/124.34
4,501,950  2/1985  Richardson .................... 219/124.34

FOREIGN PATENT DOCUMENTS

650749  3/1979  U.S.S.R. .......................... 219/124.34

Primary Examiner—Clifford C. Shaw
Attorney, Agent, or Firm—Willis E. Higgins; Edward B. Gregg; Urban Faubion

[57] ABSTRACT

An imaging sensing system (10) has a laser light source (12). Steering mirrors (16), (18) and (22) are used with scanning mirror (20) to produce scanning of beam (24) in a line (26) across a workpiece (28). Beam (36) is reflected from the workpiece (28) and directed to a linear photodiode array (38) by the scanning mirror (20). The scanning mirror (20) is connected to a galvanometer (40) to move the beams (24) and (36), both for scanning the workpiece (28) and for supplying the scanned image in sequential fashion to individual linear diodes (42) in the array (38).

15 Claims, 19 Drawing Figures

(a) BUNDLE OUTPUT BY SURFACE MODELER

FIG._8.

(b) WORK PIECE

THREE-DIMENSIONAL IMAGING DEVICE

BACKGROUND OF THE INVENTION

1. Field of the Invention

This invention relates to an improved system for obtaining information from which the shape of a three dimensional object may be obtained. It further relates to such an imaging system which is connected to carry out fabrication or other operations on an object imaged by the system. Most especially, it relates to such a system connected to provide visual inputs to a welding robot.

2. Description of the Prior Art

A wide variety of imaging systems for welding robots and other industrial robots are known in the prior art. For example, commonly assigned Kremers et al., U.S. Pat. No. 4,410,787, issued Oct. 18, 1983 and Kremers et al., U.S. Pat. No. 4,412,121, issued Oct. 25, 1983, describe such systems and are representative of the state of the prior art.

Other examples of imaging systems for industrial robots or similar systems are disclosed in the following patents: U.S. Pat. No. 3,588,452 to Kee, issued June 28, 1971; U.S. Pat. No. 3,877,821 to Price et al., issued Apr. 15, 1975; U.S. Pat. No. 3,941,982 to Knollenberg, issued Mar. 2, 1976; U.S. Pat. No. 4,093,866 to Kasdan et al., issued June 6, 1978; U.S. Pat. No. 4,223,346 to Neiheisel et al., issued Sept. 16, 1980; U.S. Pat. No. 4,225,771 to Justice et al., issued Sept. 30, 1980; U.S. Pat. No. 4,248,537 to Sick, issued Feb. 3, 1981; U.S. Pat. No. 4,339,745 to Barber et al., issued July 13, 1982; and U.S. Pat. No. 4,343,553 to Nakagawa, issued Aug. 10, 1982. Of these patents, only the last is directed to determining shape of a three-dimensional object. While that apparatus represents a sophisticated approach to the environment addressed, it is of limited applicability for use with welding robots and similar industrial robots.

SUMMARY OF THE INVENTION

Accordingly, it is an object of this invention to provide an apparatus and method for obtaining noise-free images in the presence of a welding arc that does not require additional software processing for removal of artifacts.

It is another object of the invention to provide an apparatus and method for defining three dimensional workpiece geometry in the presence of a welding arc that is unaffected by light reflections from the workpiece.

It is still another object of the invention to provide an apparatus and method for obtaining images of a three-dimensional, highly reflective workpiece.

It is yet another object of the invention to provide such an apparatus and method for obtaining images of a three dimensional, highly reflective workpiece which will do so in the presence of a welding arc.

The attainment of these and related objects may be achieved through use of the novel system, apparatus and method herein disclosed. A system in accordance with the invention provides information from which a three dimensional configuration of an object may be determined. The system includes means for projecting an analyzing beam which is reflected by the object. A means for scanning the analyzing beam does so in a plurality of repetitive lines in a first direction. A moving means moves the scanning means relative to the object in a second direction which is at an angle to the first direction. The system includes a one dimensional means for sensing the reflected scanning beam, which is aligned to receive repetitive lines of the scanning beam reflected from the object. There is a means for supplying information from the plurality of lines as outputs. An analyzing means utilizes the output to provide signals representative of the information required to construct a three dimensional configuration of the object.

While the imaging system of this invention is especially suited for determining the three dimensional configuration of a highly reflective metal workpiece during welding operations, the many desirable features of this imaging system should make it of use in a wide variety of other demanding environments for characterizing the shape of three dimensional objects.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
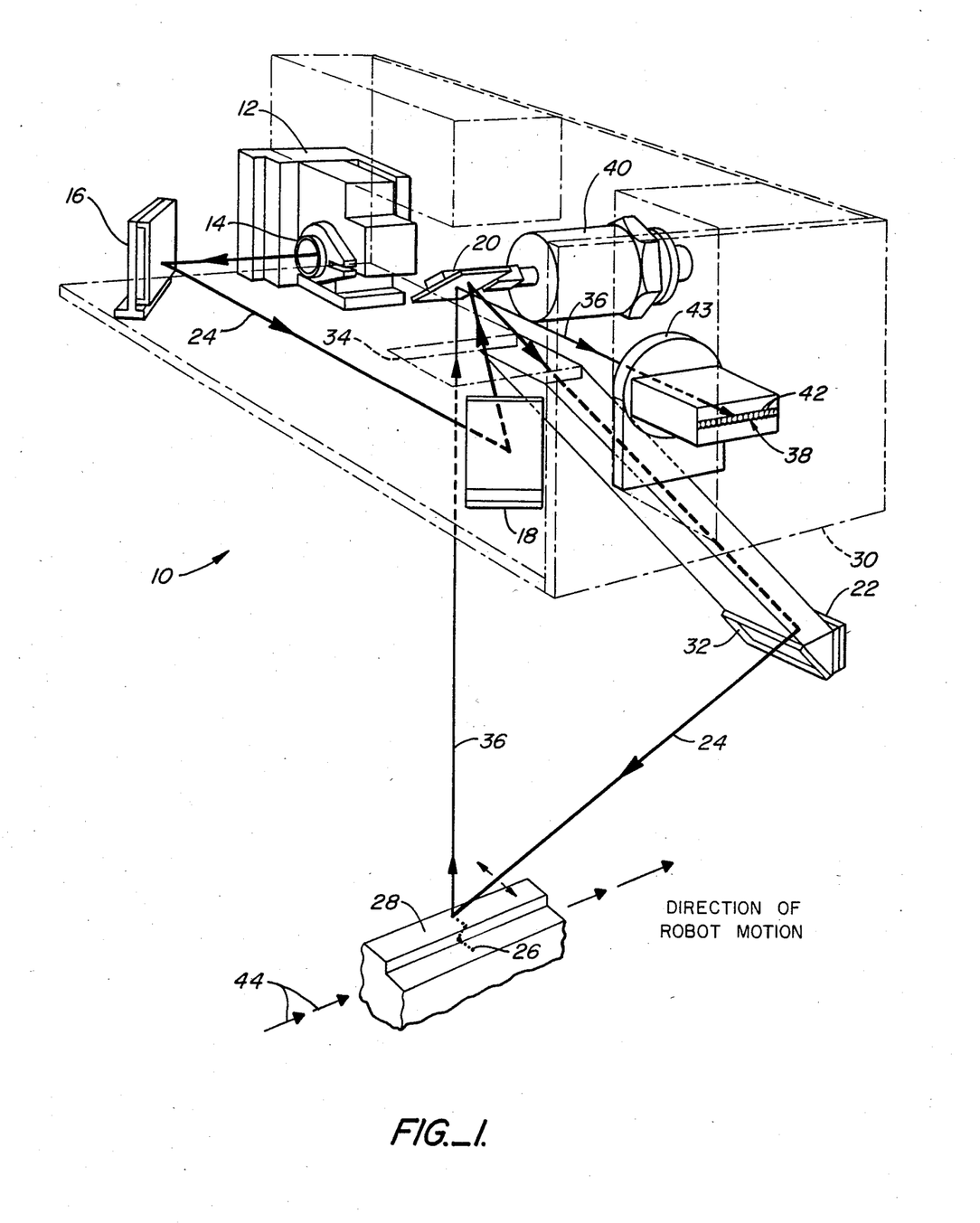
FIG. 1 is a partly schematic perspective view of an imaging system in accordance with the invention.

Turning now to the drawings, more particularly to FIG. 1, there is shown an imaging sensing system 10 in accordance with the invention. The system 10 includes a laser 12, incorporating a colimating lens assembly 14. Steering mirrors 16, 18, and 22 are used in cooperation with scanning mirror 20 to produce scanning of beam 24 in a line 26 across a workpiece 28. The laser 12, steering mirrors 16, 18 and 22, scanning mirror 20 and other elements of the system 10 are provided in an enclosed housing 30 having an output window 32 for the scanning beam 24 and an input window 34 for receiving reflected beam 36 from the workpiece 28 for scanning mirror 20 to produce a scanned image of the beam 36 on linear photodiode array 38. The steering mirrors 16, 18 and 22 remain stationary in operation of the system. The scanning mirror 20 is connected to a galvanometer 40 to move the beams 24 and 36, both for scanning the workpiece 28 and for supplying the scanned image of the beam 24 as reflected from the workpiece 28 to individual linear diodes 42 in the linear array 38. The particular diode 42 in the array 38 hit by the reflective beam 36 is determined by the distance between the workpiece 28 and the axis 21 of the scanning mirror 20. The array 38 is approximately in the focal plane of filter-lens assembly 43.

In operation, the system 10 moves in the direction indicated by arrows 44 during operation of a welding system incorporating the image sensing system 10. The result is a two-dimensional scanned frame of image information derived from the light beam 36 reflected from the workpiece 28.

In practice, the laser 12 is desirably implemented as a 7.5-mW GaAs solid-state laser. A complete image of a three dimensional "slice" of the surface of workpiece 28 is assembled by reading the output of the linear diode array 38 at regular intervals during the scan of the scanning mirror 20 and storing the readings sequentially in a computer memory.

Figure 2:
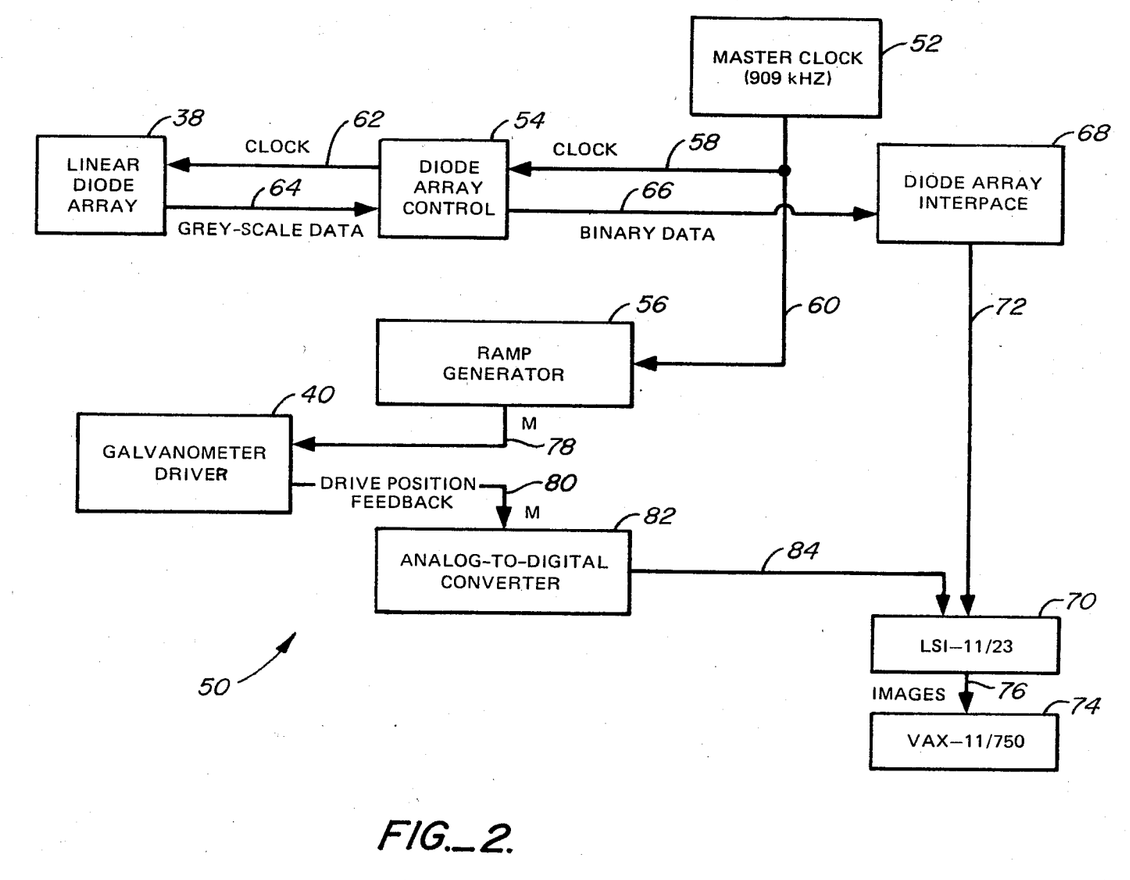
FIG. 2 is a block diagram of a system in accordance with the invention.

FIG. 2 shows a block diagram of a system 50 incorporating the image sensing system 10 shown in FIG. 2. Operation of the system 50 is controlled by a master clock 52 operating at approximately 909 kHz. The clock 52 is connected to diode array control circuit 54 and ramp generator circuit 56 by lines 58 and 60, respectively. Clock signals on lines 58 and 60 directly control the integration (exposure) interval and gating rate of the linear diode array 38, which is connected to diode array control circuit 54 by line 62, on which it receives the clock signal, and by line 64, on which grey scale data is supplied to diode array control circuit 54. Line 66 connects the diode array control circuit 54 to diode array interface, for transmittal of binary data representing an image sensed by the linear diode array 38. The diode array interface 68 is connected to scanner control computer 70 by line 72. The scanner control computer 70 is in turn connected to system control computer 74 by line 76.

Ramp generator circuit 56 utilizes the clock signal on line 60 to produce an electronically shaped sawtooth output signal on line 78, which is used to operate the galvanometer driver 40, for positioning the scanning mirror 20 (FIG. 1). The galvanometer driver 40 produces a drive position feedback output signal on line 80, which is supplied to an analog-to-digital converter 82. The converter 82 is connected to scanner control computer 70 by line 84.

In the scanner control computer 70, the diode index data are converted in hardware into run-length coded binary form and stored sequentially, along with the mirror angle reading from converter 82. At the completion of each mirror scan, the contents of this buffer, representing one two-dimensional "slice" of the surface of workpiece 28 (FIG. 1) are sent to the system control computer 74 for further processing analysis. In practice, the diode array 38 (FIG. 1) is effectively read 256 times during each scan of the mirror 20. Because the diode array has 256 elements, this yields an image with a pixel resolution of 256×256. The resolution of the workpiece is approximately 0.008 inches in the mirror scan direction of line 26 and 0.012 inches in the direction of the diode array 38. The mirror scan rate is approximately 5 Hz.

Figure 3:
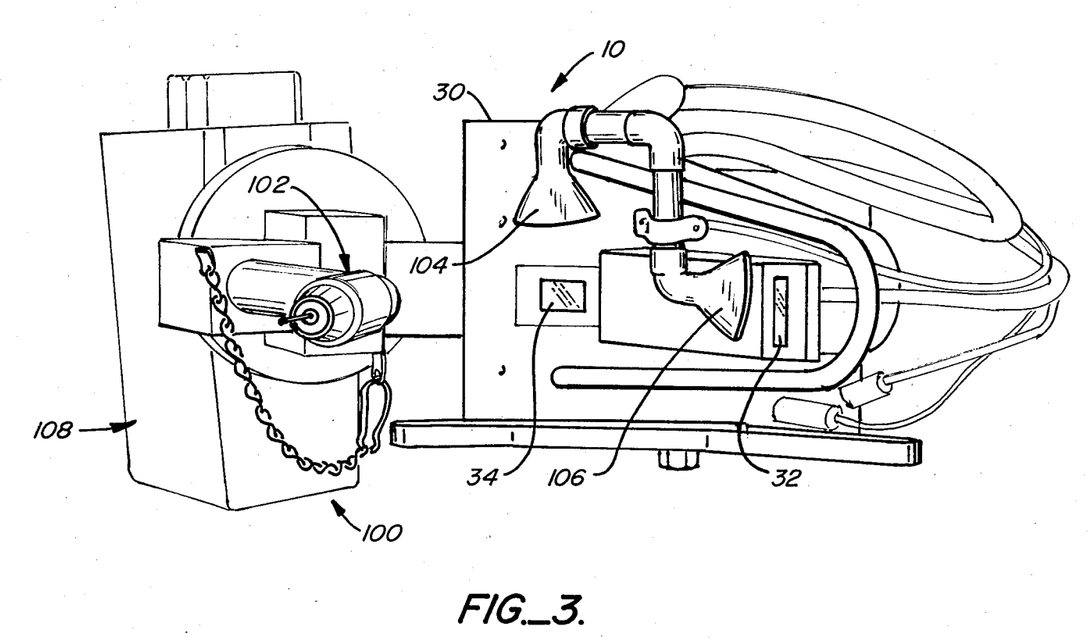
FIG. 3 is an external perspective view of the system shown in FIG. 1.

FIG. 3 shows the image sensing system 10 of FIG. 1 mounted on a welding robot 100, along with a welding gun 102 of conventional construction. As shown, the housing 30 of the system 10 has nozzles 104 and 106 positioned to direct air or other pressurized gas under pressure across the analyzing beam output window 32 and the reflected beam input window 34, respectively.

The design of the optical sensing system 10 shown in FIGS. 1 and 3 has several features which contribute to the overall utility and robustness for use in welding and similar applications. The output window 32 and input window 34 are equipped with easily replaceable pyrex glass to prevent entry of fumes and sparks to the housing 30. The compressed air blowers 104 and 106 during welding to prevent deposition of fume particles on the window surfaces. The sensor housing 30 is also overpressured with approximately 5 psi of dry compressed air to prevent entry of dirt and fumes, and also to cool the system optical components. The video amplifier circuits, laser 12, and diode array 38 are mounted on Peltier cooling units to ensure thermal stability. Laser power drift and thermally induced changes in the sensitivity of the diode array 38 and video amplifier circuits are eliminated.

The optical geometry and dimensions of the imaging sensing system 10 are designed to give a projection angle of 45 degrees, a baseline of 14.84 inches, and a nominal sensor-to-workpiece distance of 10.5 inches. At this distance the field of view has dimensions of 3 inches in the dimension parallel to the array axis and 2 inches in the scan direction.

Table 1 shows the general specifications for the system 10.

TABLE 1

| IMAGING SENSOR - GENERAL SPECIFICATIONS | |
|---|---|
| Attribute | Specification |
| Baseline length (inches) | 14.84 |
| Nominal working height measured from scanner input window (inches) | 10.5 |
| Projection angle (degrees) | 45 |
| Scanning rate (scans/second) | 5 |
| Field of View: | |
| Length, array direction (inches) | 3 |
| Width, scan direction (inches) | 2 |
| Depth (inches) | 3 |
| Resolution (pixels) | 256 × 256 |
| Resolution (inches on workpiece) | |
| Height, array direction (inches) | 0.012 |
| Width, scan direction (inches) | 0.008 |
| Depth (inches) | 0.012 |
| Laser spot diameter, approximately (inches) | 0.024 inches |
| Laser power, at workpiece (mW) | 5.06 |
| Package dimensions (L × W × H), scanner only (inches) | 8.5 × 9 × 7 |
| Weight, scanner only (lbs) | 3 |
| Housing overpressure (psi) | 5 |
| Window blower pressure (psi) | 60 |

The optical and electronic parameters of the system 10 and the system 50 are further shown in Table 2.

TABLE 2
IMAGING SENSOR - OPTICAL SPECIFICATIONS

| Attribute | Specification |
| --- | --- |
| Laser | |
| Make and type | Hitachi, Model HLP 1400 |
| Power output (mW) | 15 |
| Wavelength (nm) | 820 to 830 |
| Collimating lens | Olympus VP3660-3 |
| Lens focal length (mm) | 3.6 |
| Lens numerical aperture | 0.6 |
| Operating temperature (°C.) | 20 |
| Diode Array | |
| Make and type | Reticon Model RC-101 |
| Total usable diodes | 254 |
| Average diode spacing, centers (inch) | 0.001 |
| Element size (cm$^2$) | $6.45 \times 10^{-6}$ |
| Lens type | Super Cormat |
| Lens focal length (mm) | 25 |
| Lens aperture (f) | 1.9 |
| Interference Filter | |
| Wavelength (nm) | 820 |
| Passband (nm) | 10 |
| Mirror | |
| Type | Gold on glass substrate |
| Reflectance at 820 nm (percent) | >98 |

As noted above, the output of the imaging sensing system 10 is a two-dimensional image in which one dimension represents the mirror angle, and the other the index, v, of the diode array 42 hit by the image of the laser spot on the workpiece 28. Conversion of these data into three-dimensional, x-y-z coordinates as required by the surface modeling and geometric analysis processes entails two steps:

Step 1

The (a,v) data for a given point are first converted into sensor-relative three-dimensional form by solution of the matrix equation:

$$\begin{bmatrix} SX' \\ SY' \\ SZ' \\ S \end{bmatrix} = M \begin{bmatrix} v \\ a \\ 1 \end{bmatrix}, \quad (4)$$

where M is a 4×3 matrix representing the sensor perspective transform and the equation of the light "plane" generated by the scanning laser beam, and X'-Y'-Z' are the three-dimensional coordinates of the point in a coordinate system that is fixed with respect to the sensor.

Step 2

The sensor-relative x'-y'-z' coordinates are then converted into a coordinate system whose origin is fixed in the "world" by means of a second matrix equation:

$$\begin{bmatrix} X \\ Y \\ Z \\ 1 \end{bmatrix} = T(t) \begin{bmatrix} X' \\ Y' \\ Z' \\ 1 \end{bmatrix}, \quad (5)$$

where T(t) is a 4×4 matrix representing the position and orientation (pose) of the robot arm 108 (FIG. 3) at time t.

The output of this procedure is a set of three-dimensional x-y-z coordinates representing the position of each point on the workpiece surface in a stationary world-coordinate system. This data set may also be considered to represent a cross-sectional three-dimensional "slice" through the workpiece taken in the plane defined by the laser scan.

Figure 4:
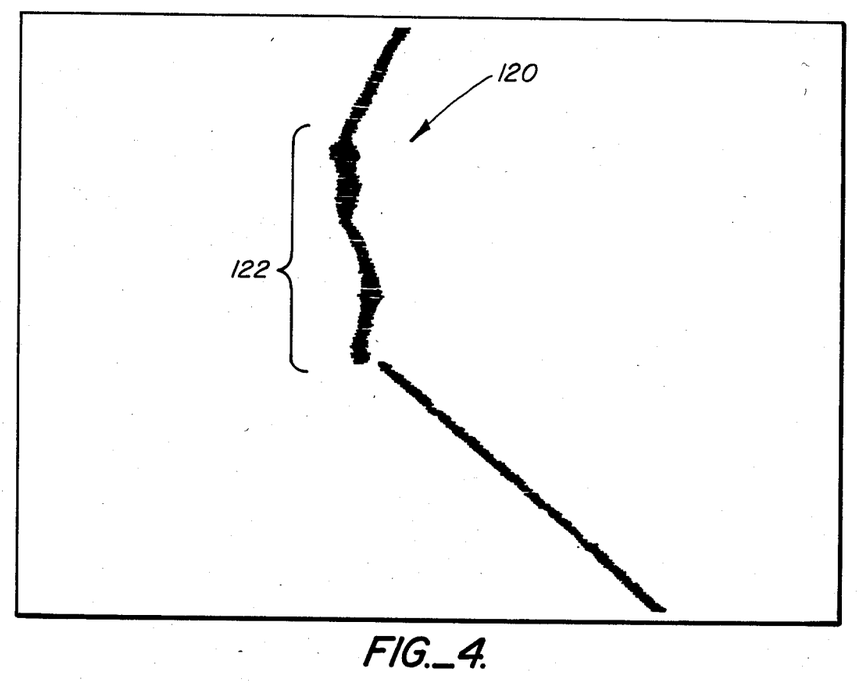
FIG. 4 represents a scanning image obtained in practice of the invention.
Figure 5:
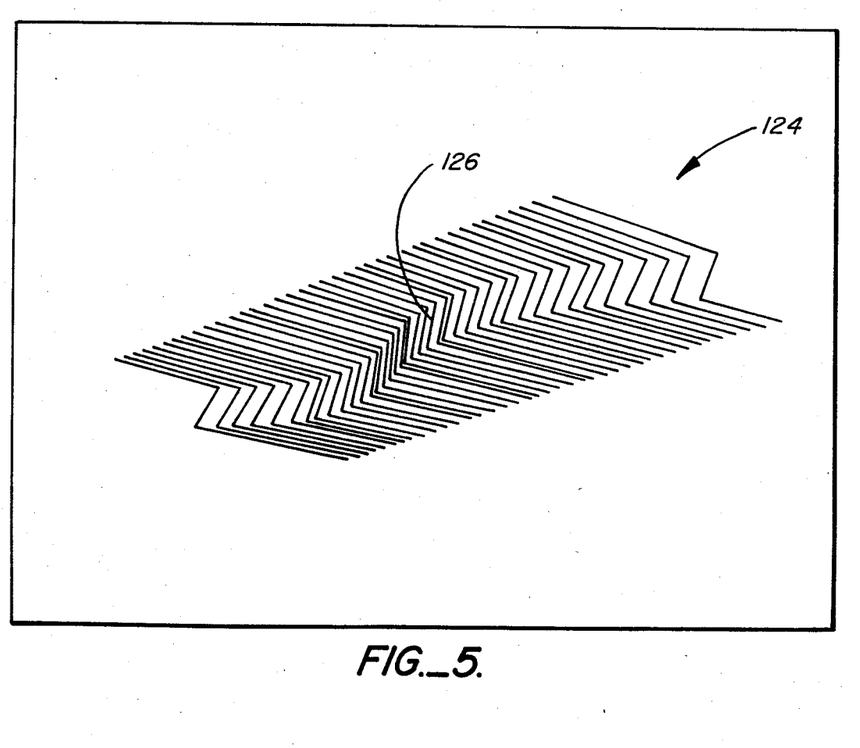
FIG. 5 is a representative display of a three dimensional object analyzed in accordance with the invention.

FIG. 4 shows a two-dimensional display 120 of a single scan of a fillet joint containing a tack weld at 122. In this view, the vertical axis represents the mirror angle, a, while the diode index is plotted on the horizontal axis. FIG. 5 shows a perspective display 124 of a curving lap joint 126.

The following is a discussion of how workpiece images such as shown in FIG. 5 are obtained. As discussed above, the three-dimensional data points generated by the sensor system 10 are assembled into a three-dimensional surface model of the joint area. In this model, flat workpiece surfaces are represented as single planes, while curved surfaces appear as piecewise polyhedral approximations. Each of these planes is represented by an equation of the form $$Ax + By + Cz + D = 0 \quad (6)$$

where the coefficients A, B and C define a unit vector that is normal to the plane (hence specifying its orientation in space), and D is the distance from that plane to the origin of the coordinate system.

The objective of the surface-modeling process is to segment the region of the workpiece seen by the imaging system into its surface components and to determine the values A, B, C and D for each of them.

Figure 6:
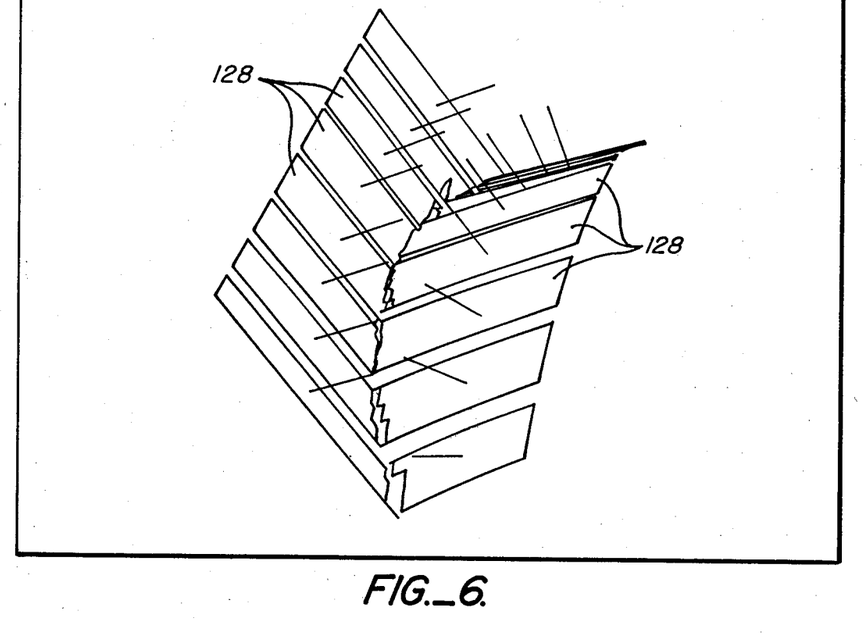
FIG. 6 is an image display generated in practice of the invention.
Figure 7:
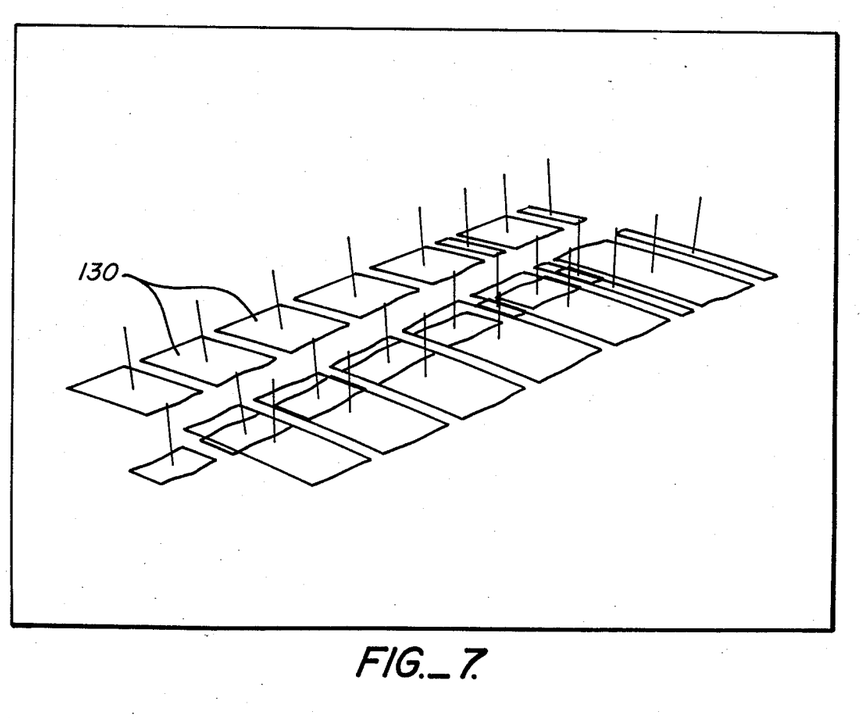
FIG. 7 is another image display of another image generated during practice of the invention.
Figure 8:
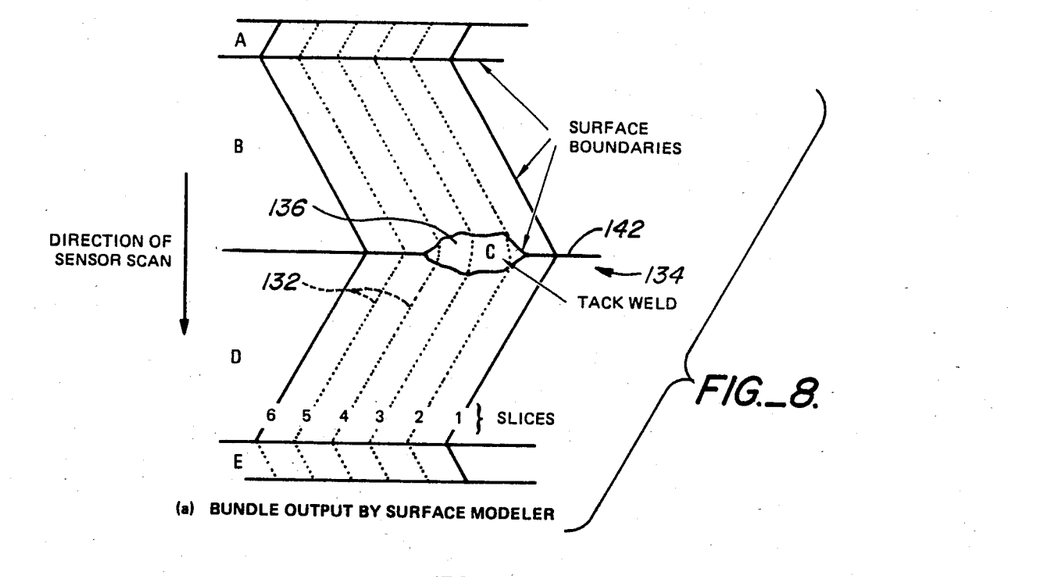
FIG. 8 is a perspective view of a workpiece useful for understanding practice of the invention.
Figure 9:
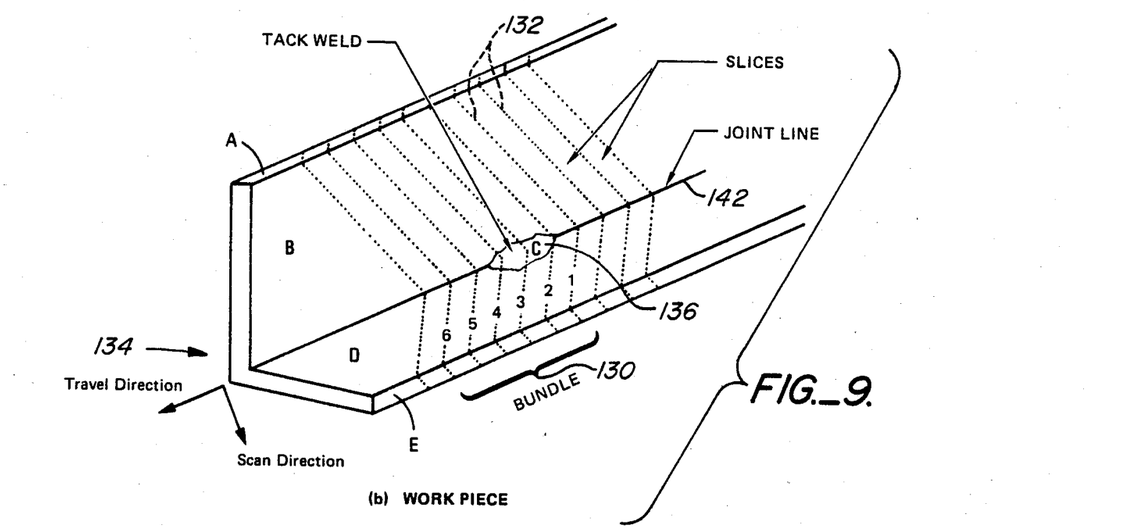
FIG. 9 is a perspective view of another workpiece, also useful for further understanding of the invention.
Figure 10:
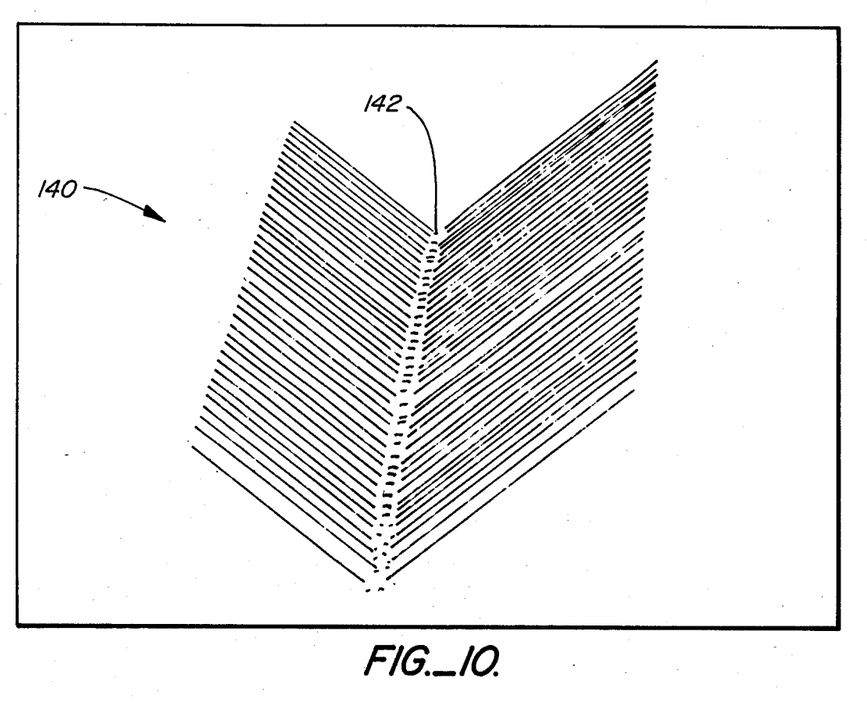
FIGS. 10, 11, 12 and 13 represent image displays useful for understanding practice of the invention with the workpieces shown in FIGS. 7 and 8.

The plane-fitting algorithm operates on a "working window" that contains NB "bundles," each consisting of NS three-dimensional data slices generated by the sensor, where NB≧1 and NS≧2. Both NB and NS depend on the distance between the welding torch and the sensor viewpoint, the required processing speed and accuracy, and the curvature of the workpiece. When welding a curved workpiece, NB≧2 and the working window is advanced in steps of one bundle at a time. In this way, each data point will be fitted at least NB times and resulting surfaces will be more closely tangent, rather than secant, to the workpiece surface. Examples of data bundles 128 and 130 for curved and flat surfaces are shown in FIG. 6 and FIG. 7. FIGS. 8 and 9 show the relationship of the slices 132 in a bundle 130 to the structure of a fillet joint 134 containing a tack weld 136. FIG. 10 shows the contents of a typical window 140 for the straight fillet joint 134. In this case, the window is about 4 inches long, as measured along the joint line 142.

Figure 11:
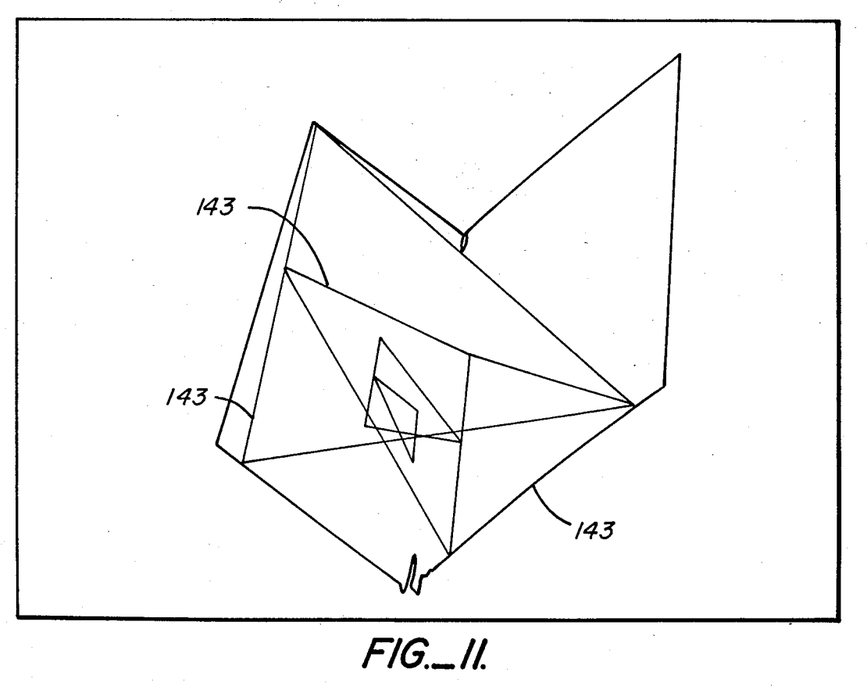

After the system is "primed" by acquiring a sufficient number of data slices 132 and bundles 128 or 130 to fill a working window 140, the fitting algorithm proceeds as follows:

1. A "seed plane" 143 (FIG. 11) is fitted to the window 140 by selecting three arbitrary data points forming a triangle. The surface normal for this "seed plane" is computed by using two sides of this triangle as vectors and calculating their cross product. This computation yields coefficients A, B, and C in Eq. 6 above. Coefficient D is computed by solving Eq. 6 with computed values of A, B, and C, and the average x, y, and z values for the three corners of the triangle. FIG. 11 shows seed planes 143 for the data of FIG. 10.

2. The remaining points interior to the triangle formed by the three initial points are tested to determine if they lie on this seed plane 143. The test is conducted by verifying that each point satisfies Eq. 6 within a specified tolerance.

3. Failure of the above test for a sufficient number of points indicates that the three corners of the initial triangle do not lie on the same plane. If such is the case, the original triangle is subdivided into four smaller triangles and Steps 1 and 2 are repeated. This segmentation process continues recursively until the triangles become too small or until the test specified in Step 2 is satisfied.

Figure 12:
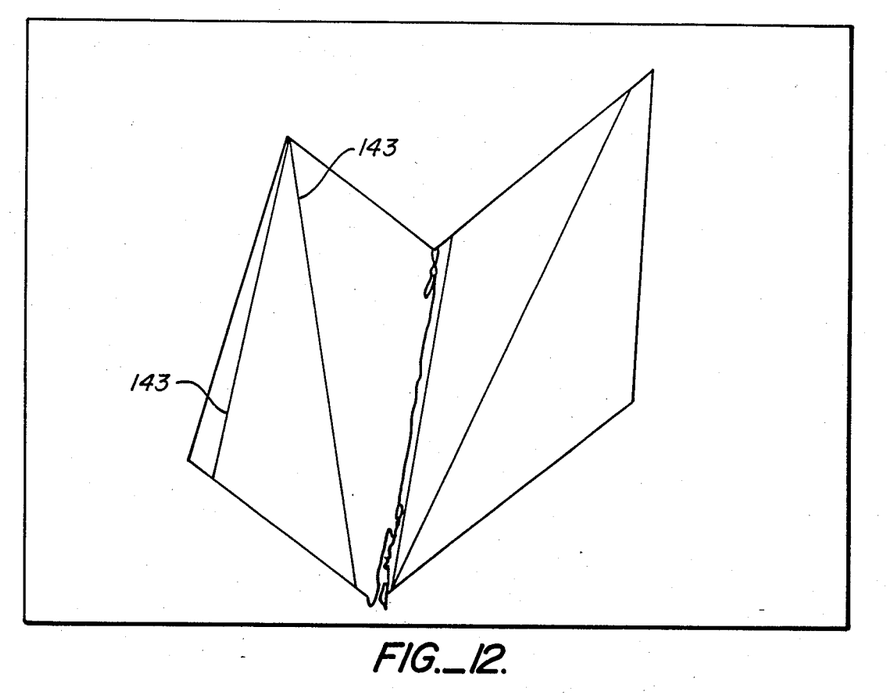
Figure 13:
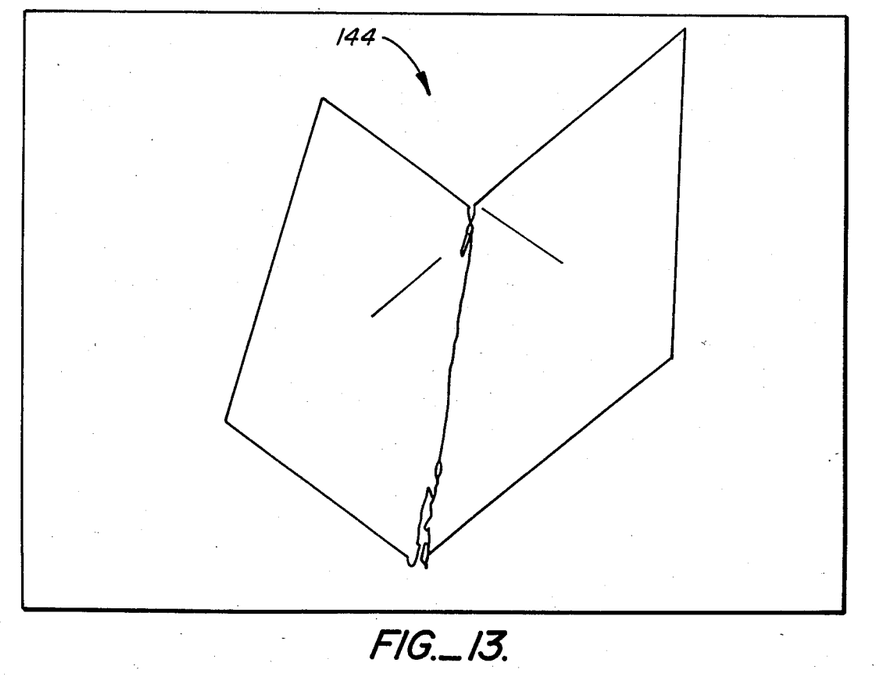

4. When a suitable seed plane is found, it is extended outward by testing all surrounding data points until either the edge of the working window is reached—or a group of points is found that no longer satisfies the plane equation (i.e., the edge of the surface is reached). Note that this expansion process may subsume adjacent seed planes that were created in previous subdivision steps. FIG. 12 shows the progress of this expansion step; FIG. 13 shows the completed fillet model 144 for fillet joint 134.

5. Regions in which the seed triangles 143 either become too small or cannot be fitted with any plane are marked as "undefined" and removed from further consideration by the fitting algorithm. Examples of such regions might include tack welds, spatter globules, and gaps caused by irregular workpiece edges.

6. As new data slices arrive from the sensor, they are added to the leading edge of the front bundle in the working window. Whenever a new bundle is filled, another is removed from the trailing edge of the window 140 and transferred to the geometric analysis process. The algorithm then returns to Step 1 to begin processing the next window.

For each bundle 128 or 130, the output of the surface modeler includes:

A list 150 (FIG. 14) of data blocks 152 for all fitted planes and unexplained regions.

Figure 14:
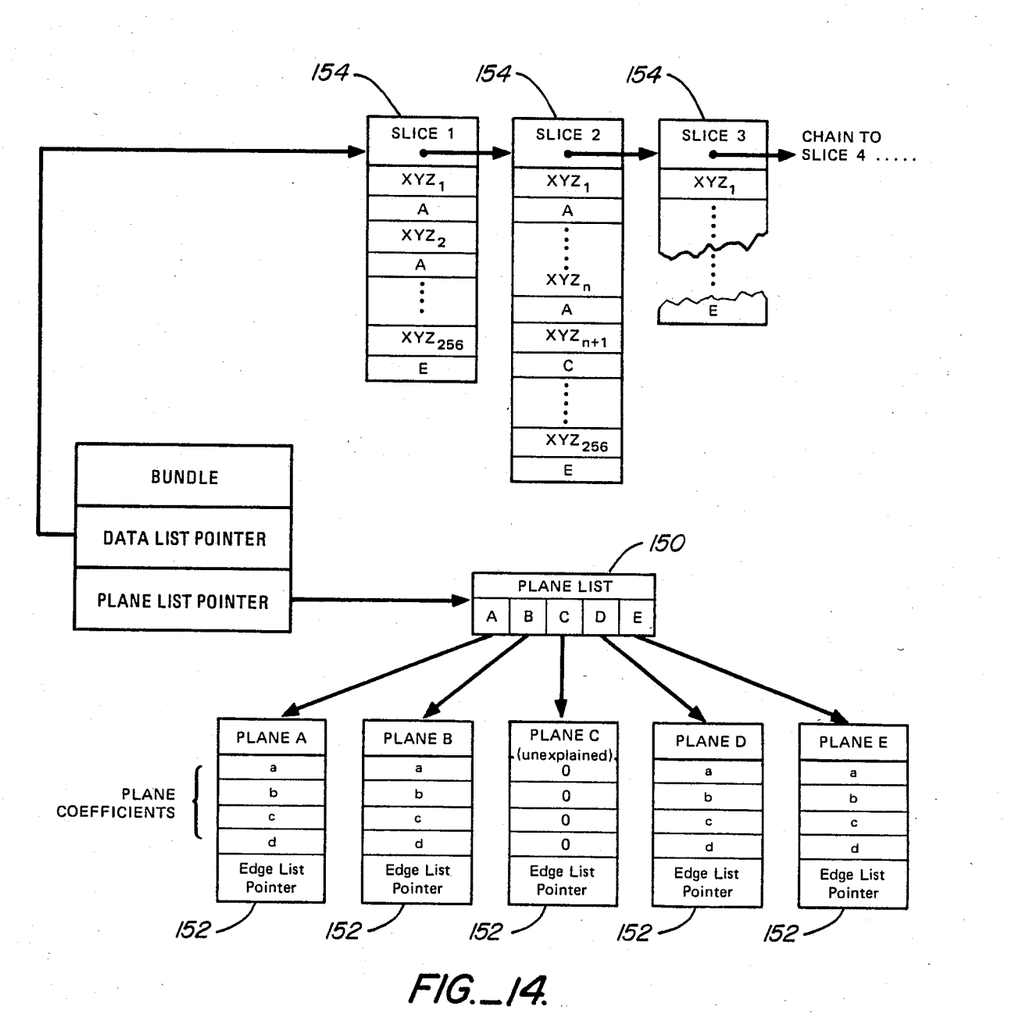
FIG. 14 is a combination block and flow diagram useful for understanding practice of the invention.

A list of all data slices 154 in the bundle 128 or 130.

Lists of boundary points 154 for all planes and unexplained regions.

Figures 15, 16:
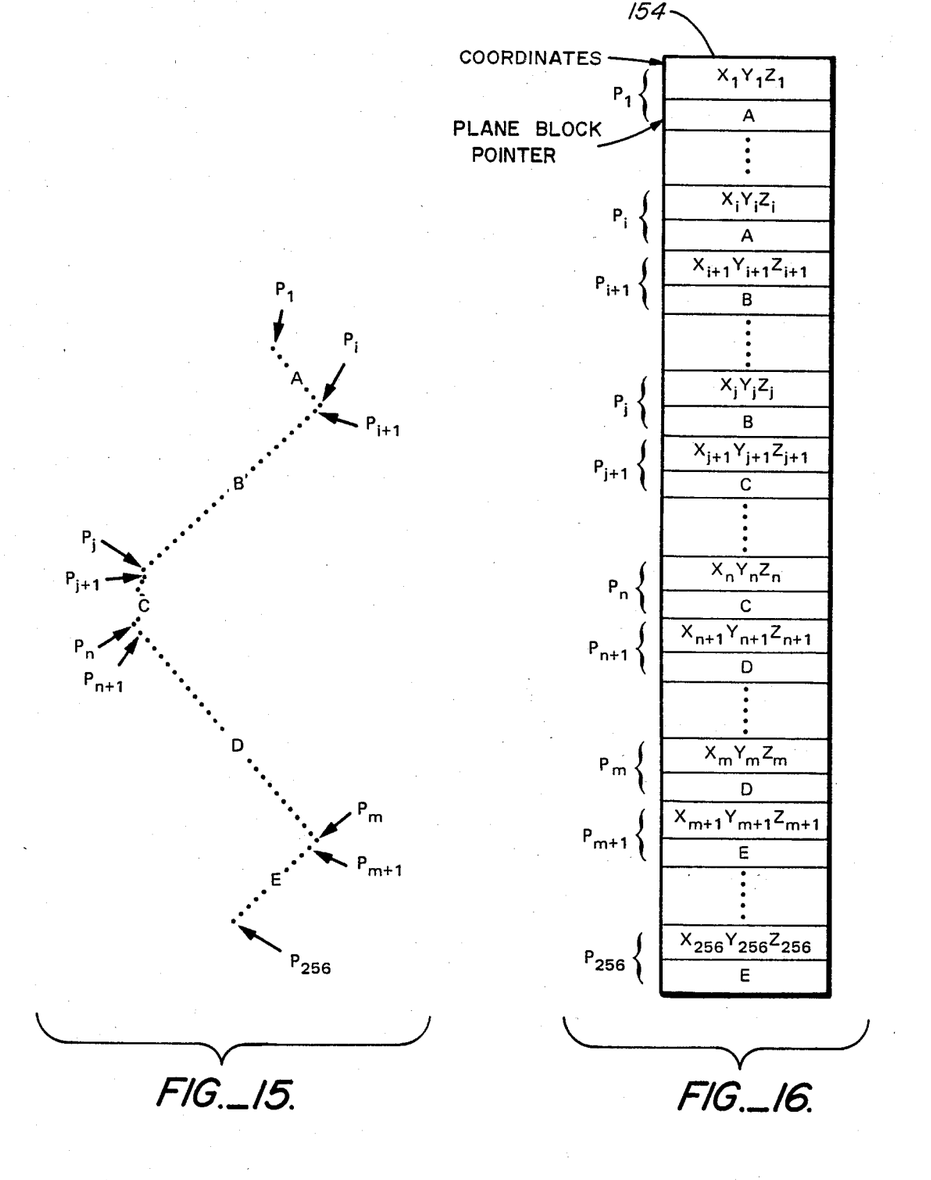
FIG. 15 is a pictorial representation of data points useful for understanding operation of the invention.
FIG. 16 is a block diagram of a data block, useful for understanding operation of the invention.

As shown in FIG. 14, the plane data blocks 152 contain the coefficients A, B, C, and D for that plane as well as a pointer to a list of the plane's boundary points. Data blocks for unexplained regions contain only this boundary list pointer. Each x-y-z data point in every slice also contains a pointer to the data block for the plane or unexplained regions on which it resides. The structure of a typical data slice 154 is shown in FIGS. 15 and 16.

A further geometric analysis is used to verify the presence of a specified object geometry in the surface model. The specific classes of objects to be considered consist of different types of weld joints, corners, plate ends, tack welds, and other artifacts that require special consideration by the robot controller. In addition, if a weld joint is to be verified this process must also determine the precise location of the joint line and make any fit-up and geometry measurements needed to control the welding process and torch attitude.

To provide a fast, flexible means of accomplishing this task, we have devised a rule-based approach in which an easily programmed network of heuristic rules controls the analysis process. The following discussion provides a detailed description of the operation of this process in locating and following a fillet joint.

The geometric analysis processes each dataslice 154 in the bundles 128 or 130 supplied to it by the surface modeler. The geometrical structure of each slice is represented by a graph in which each node represents a workpiece surface and each edge (line between adjacent nodes) represents the boundary and geometrical relationship between adjacent surfaces. For example, the fillet-joint data slice 154 shown in FIG. 16 is represented by the graph shown in FIG. 17. This graph is constructed from the x-y-z coordinate values and plane block pointers contained in each data point of the slice.

Figure 17:
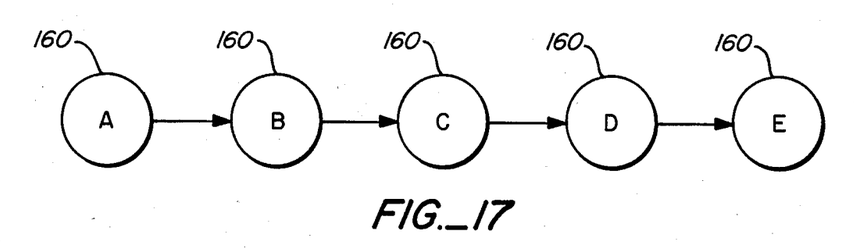
FIG. 17 is a directed graph useful for understanding operation of the invention.

Because a weld joint in general consists of two principal surfaces and their common boundary, the analysis for weld joints attempts to reduce the initial graph representation of the entire slice (which includes surface boundaries not to be welded) to a graph of only two nodes 160 and one edge (e.g., the nodes representing surfaces B and D and the edge representing their intersection). The two nodes 160 represent the principal weld joint surfaces, and the edge identifies their common boundary—the joint line. When this two-node, one-edge graph is derived, the analysis is said to succeed. Note that this goal graph structure may be different for other object geometries. For example, an internal corner might reduce to a graph containing three nodes 160 and two edges.

The data structure representing a graph edge contains pointers to the x-y-z coordinates of the surface boundary points. Once the analysis succeeds, the pointers in the single remaining graph edge contain the precise location of the joint line in the slice 154 being processed. Processing a bundle of such slices 154 yields a sequence of points along the joint line.

In order to reduce the initial many-node graph to the desired two-node form, a set of heuristic rules is applied to the graph representation. Each rule eliminates graph nodes 160 or edges that are not candidates for principal surfaces or the joint line. Rules are expressed in the algorithmic form: If a specific condition is true, then modify the graph by adding or deleting particular nodes 160 or edges and either removing and reconnecting, in their original order, the nodes and edges that remain. The condition portion of the rule is applied to each node or edge in the graph, and thus the graph may be modified several times by one application of a rule. An example of a set of rules applicable to a fillet joint is shown in Table 4.

TABLE 4

| RULES FOR FILLET JOINT ANALYSIS | | |
|---|---|---|
| Rule Name | Condition | Graph Modification |
| Previous Edge | Exact graph resulting from analysis of previous slice in this bundle (i.e., surface labels and boundary data) is present in graph of current slice | Remove all nodes and edges except the same two nodes and edge of previous graph |
| Reduce Node | Width of surface is less than user-selected minimum | Replace the corresponding node and its attached edges with single edge. Repeat application of this rule on each node in the graph |
| Angle Compare | Angle between two surfaces is outside the user-specified range | Remove the edge that represents that boundary and any nodes that are left unattached. Repeat application of this rule on each edge in the graph |
| Edge Guess | Only one node of the previous joint graph is present in the current graph | Remove all nodes not attached to the recurring node |

Many of the same heuristic rules may be used to analyze a variety of different objects and joint types (for example, fillet, butt, and lap joints and corners), but the order in which the rules are applied is unique to each analysis. There is one fixed application network (an ordering by which the rules are applied) for each type of joint or object. The order of application for a fillet joint is: "Previous Edge", "Reduce Node", "Angle Compare", and "Edge Guess".

After the application of each rule, the graph is checked for the two-node, one-edge form by simply counting the number of nodes and edges that remain.

The general analysis procedure may be summarized as follows:

1. Build a graph of the data slice as described above.
2. Apply to the graph the "next" rule in the network associated with the desired object. Note that "next" is determined by traversing the network from left to right and top to bottom.
3. If the application of the rule reduces the graph to the desired form (i.e., two nodes and one edge) then the analysis suceeds and the object has been located. If application of this rule does not reduce the node graph to the desired goal form, and there are more nodes in the graph, then go to Step 2.
4. If no nodes are left in the graph or no rules remain to be tried in the network, then the analysis fails. This occurs when the sought-for object cannot be found in the field of view.

Assuming that the slice shown in FIG. 16 is the first in which the tack weld 136 is visible, the analysis procedure would proceed as follows:

1. Build the graph of the fitted slice containing fillet with tack weld. Note that five surfaces are intersected by this slice, thus the graph contains five nodes (see FIG. 17).
2. Apply the first rule in the fillet network, in this case "Previous Edge." Because the condition for application of this rule is not met (i.e., the principal surfaces, B and D, located in the previous slice in this bundle are no longer adjacent), "Previous Edge" has no effect and the graph is unchanged.
3. Apply the next rule in the fillet network, in this case "Reduce Node." This rule eliminates surfaces too small for consideration in the analysis, in this case the tack weld 136. Application of this rule does not reduce the graph to the desired two-node, one-edge form.
4. Apply the next rule in the fillet network, in this case "Angle Compare." This rule eliminates boundaries between surfaces whose angle of intersection is outside a user-specified range. The angle of intersection is measured counter clockwise from the topmost surface (see FIG. 15). In this case boundaries A-B and D-E have intersection angles of 270 degrees and the specified range for a fillet joint is 90 plus or minus 5 degrees. The edges between nodes A and B and D and E are therefore removed, leaving nodes A and E unattached. These nodes are also removed, because the rule also deletes unattached nodes (see Table 4).
5. Because this rule application reduces the graph to the desired form (i.e., two nodes and one edge), the procedure exits with a pointer to the data at the boundary (the joint line) between the two surfaces. In this case, two data points are returned: the boundaries of the tack weld 136 (undefined region C) with the principal surfaces B and D. Note that these data points also contain the coefficients for the fitted surfaces (B and D) and that the data points in region C may be used to estimate its volume. Hence, the analysis process also outputs the dimensional information needed to decide how to process the tack weld (i.e., whether to skip over it or "burn it in") and the geometrical information needed to control the torch attitude, as described below.

The procedure above is repeated for every data slice 154 in the bundle passed to the model analysis, thus generating a sequence of points along the weld joint 142. Note that the "Previous Edge" rule makes use of the analysis of previous slices in the bundle currently being processed. This facility can greatly increase the operating speed of the procedure on complex weldments.

The joint location and geometry data output by the geometric analysis must be further processed by the robot control procedure to yield guidance and control information for the robot and welding apparatus. This procedure operates by using the surface-model parameters and joint-location data output by the geometric analysis to define the origin and orientation of a moving "weld-joint coordinate system". This coordinate system has its origin fixed on the joint line and travels along the joint as the weld is made. This system provides a consistent coordinate frame for specifying torch attitude and motion parameters. The mathematical procedure used to define this coordinate system is different for each type of weld joint, and is specified as part of the rule set for a particular joint type. In general, however, the axes of this system will be defined by a set of vectors that are derived from the workpiece surface normals, together with a third vector that defines the joint line trajectory.

Figure 18:
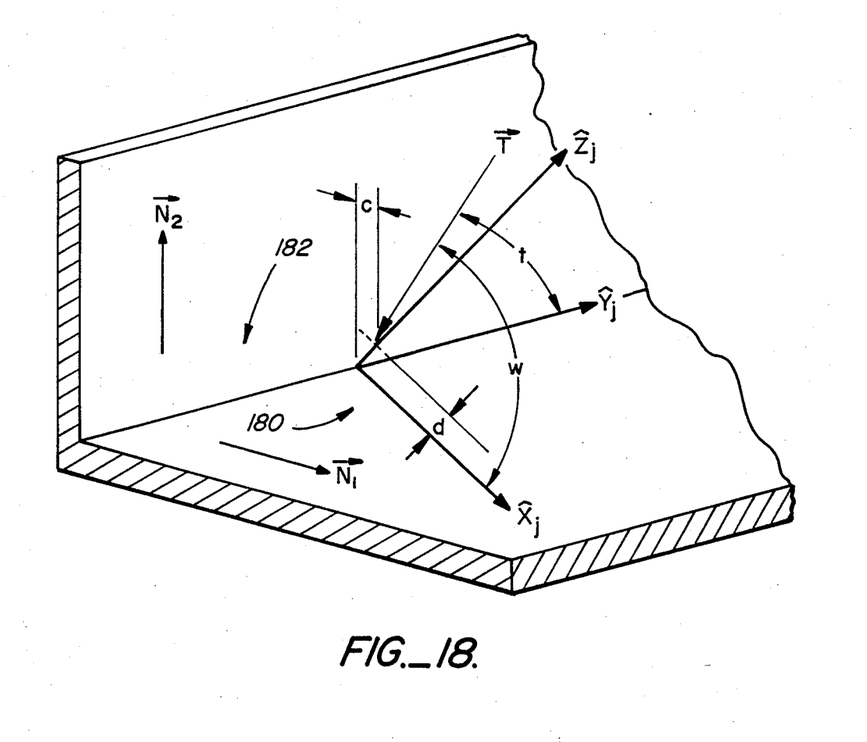
FIG. 18 is a perspective view of a workpiece, containing coordinate information useful for understanding operation of the invention.

FIG. 18 illustrates the joint coordinate system 180 for a fillet joint 182. In this figure, vectors $\hat{x}j$, $\hat{y}j$, and $\hat{z}j$ define the (x,y,z) coordinate system, $\vec{T}$ is the torch vector, d is the stickout distance, c is the cross-seam offset, and w and t are the work and travel angles, respectively. Vectors $\hat{x}j$, $\hat{y}j$, and $\hat{z}j$, are defined by the vector equations:

$$\hat{z}j = (\vec{N1} + \vec{N2})/2 \qquad (7)$$

$$\hat{x}y = \hat{y}j \times \hat{z}j, \qquad (8)$$

where $\vec{N1}$ and $\vec{N2}$ represent the workpiece surface normal vectors and $\hat{y}j$ is a vector derived from a sequence of adjacent joint points that always points in the direction of robot travel.

The welding-torch attitude and position with respect to the joint are defined by the torch vector, $\vec{T}$, and the values of the stickout and cross-seam offset, d and c. The work and travel angles, w and t, are defined as rotations of vector $\vec{T}$ about axes $\hat{y}j$ and $\hat{x}j$, respectively; the cross-seam offset, c, and the stickout, d, are defined as translations of the tip of this vector along axes $\hat{x}j$ and $\hat{z}j$, respectively. Note that the values of w, t, c, and d are part of the preprogrammed welding-procedure information and that the conditions w=t=0 and c=d=0 result in the alignment of $\vec{T}$ with axis $\hat{z}j$ while the tip of $\vec{T}$ is on the joint line.

The sequence of tasks in welding a complete workpiece is specified by the operator during system setup and stored in a data base called the "weld map". A particular task specification in the map may instruct the system either to identify visually and weld a particular type of weld joint or other object, or to execute some other action, such as moving blindly to another location on the workpiece.

Associated with each task in the weld map are the data required to control its execution. For welding tasks, the most important data item is the name of the predefined rule network that is used for visual verification and joint location, together with the definition of the joint coordinate system. Other necessary information includes the length of the weld, joint geometry tolerance information, welding parameter and procedure specifications, and error recovery procedures. The data included for nonwelding tasks might include the name of a data file containing a pretrained sequence of workpiece-relative, joint-to-joint transition moves, action commands (e.g., "prime" or "retreat"), absolute robot motion commands, or messages to the system operator.

Figure 19:
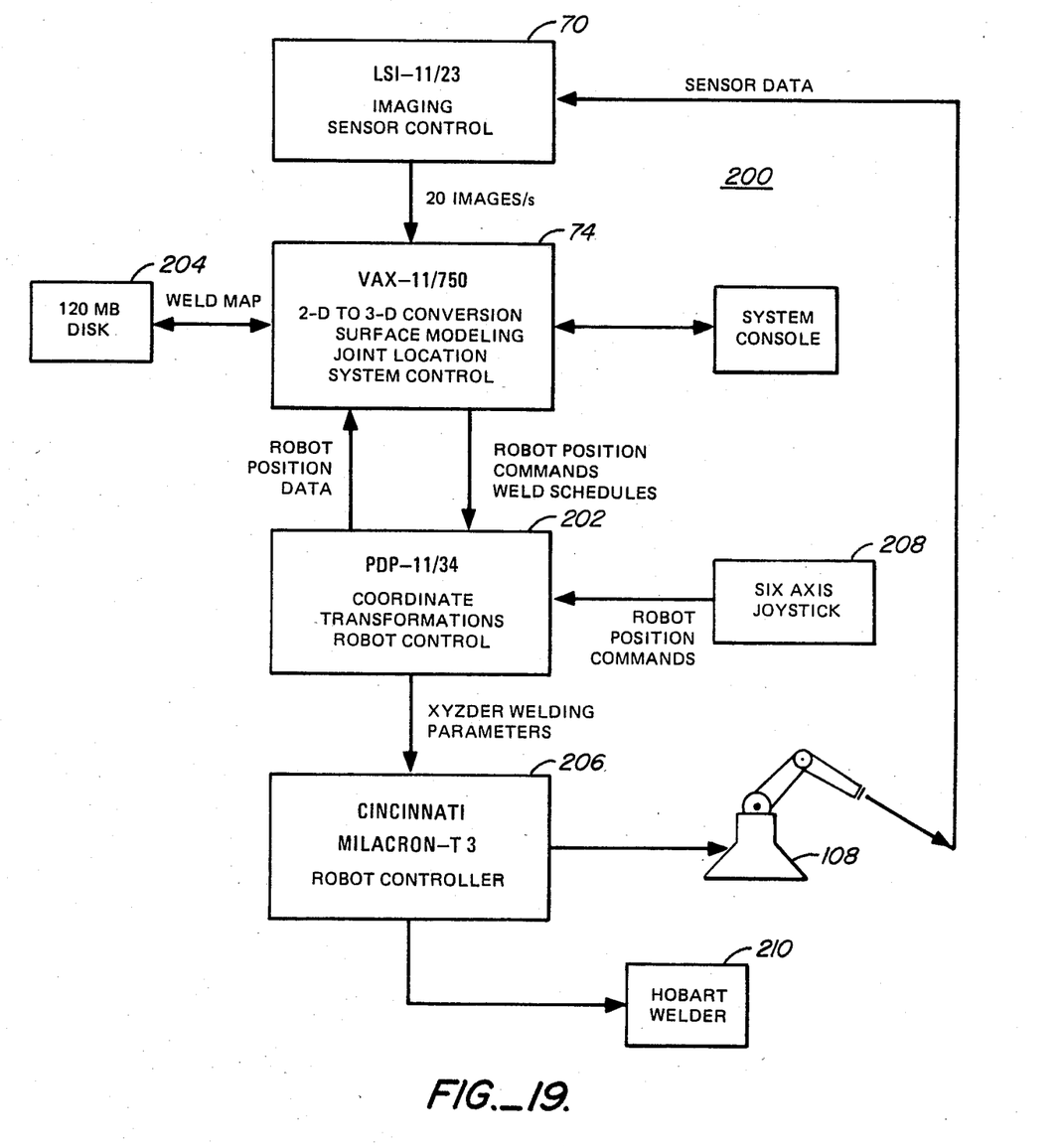
FIG. 19 is a more detailed block diagram of a portion of the system shown in FIG. 2.

A welding robot system 200 incorporating the invention is shown in FIG. 19. Three computers 70, 74 (see also FIG. 2) and 202 control this system. The functional "division of labor" is as follows:

The LSI-11/23 sensor control computer 70 controls the operation of the sensor 10 and transmits raw, two-dimensional, run-length coded binary image data to the VAX 74 for analysis. The interface between these two computers consists of a Model DRV11-B, 16-bit DMA interface on the LSI-11 70, which communicates with a similar DR11-W interface on the VAX 74.

All top-level system-control and image-processing functions are implemented on the VAX-11/750 74. These include workpiece programming, two- to three-dimensional image conversion, surface modeling, and joint finding. The system control data base is also managed by the VAX and resides on the RM80 disk storage system 204. Data describing the location of the joint line and the joint geometry, together with welding parameters are sent to the PDP-11/34 202 for further processing and eventual transmission to the robot 206. During workpiece programming and input of each image, robot poses are also sent to the VAX 74 by the PDP-11/34 202. The interface between the VAX 74 and the 11/34 202 is implemented by DR11-W units on each machine.

Joint location and geometry data together with welding schedule information are processed by the PDP-11/34 for transmission to the T3 robot. The data sent to the robot include poses (expressed in inches and degrees) and digital-to-analog converter (DAC) values and contact closure information for control of the welding apparatus. The PDP-11/34 also receives position commands from the joystick by means of the analog-to-digital converter for manual control of the robot pose. Robot poses are also transmitted on request to the VAX for use in image processing and workpiece programming. A 9600-baud, 8-bit serial link is used to interface the PDP-11/34 to the T3 robot.

As implemented, the system 200 desirably consists of the following hardware components:

The sensor 10 described above.

A DEC Model VAX-11/750 computer system 74 equipped with 2.0 megabytes of memory, a DEC Model RM-80 124-megabyte disk 204, a DEC Model TU-77 tape drive, a Model DZ-11 8-port serial line interface, and two Model DR11-W, high-speed, 16-bit parallel DMA interface units.

ADEC Model PDP-11/34 computer system 202 equipped with 64K words of memory, a Data Translation Corporation Model DT1711 analog-to-digital converter (ADC) interface, a DEC Model DR11-W high-speed, 16-bit parallel DMA interface unit, DEC Model DL11-W and DL11-E serial line units, and two DEC Model DR11-C 16-bit parallel interfaces.

A six-axis joystick assembly 208, consisting of Measurement Systems, Inc., Model 544-G791 three-axis joystick with a Model 4676 thumb-operated miniature joystick mounted in the head of the grip.

A Cincinnati Milacron T3 industrial robot 206 equipped with an external-function RS232 serial line interface, special arc-welding servo package, DAC/ADC I/O for control of welding parameters, and 24-line contact closure I/O (for control of the welding apparatus). In addition to this standard hardware, the T3 controller 206 is equipped with special Dynamic External Path Control (DEPC) software that allows real-time input of robot setpoints Hz from an external computer at rates of up to 50 Hz.

Hobart Brothers Company MIG welding apparatus 210, consisting of a Mega-Con 111 controller, a Model RC450 RVS, 450-A, constant-voltage power supply, a Model H4S wire feeder, a water cooling unit, and a Model WCG-600 water-cooled torch assembly.

All software for the VAX-11/750, including the image processing, surface modeling, joint finding, and workpiece programming subsystems, is implemented in the UNIX C language under the EUNICE operating system.

All PDP-11 and LSI-11 software is implemented in the BLISS-11 language using a cross compiler written for the DEC 2060 computer by Carnegie-Mellon University.

The joystick module 208 is used both to teach a sequence of operations to the system 200 and for manual control of the system.

It should now be readily apparent to those skilled in the art that a novel system for imaging three-dimensional objects which may be incorporated in a system for carrying out operations on the objects, such as a welding robot, capable of achieving the stated objects of the invention has been provided. This imaging system obtains images from a highly reflective three-dimensional workpiece. These images may be obtained in the presence of a welding arc, and no software processing for the purpose of removing image artifacts created by the welding arc is required.

It should further be apparent to those skilled in the art that various changes in form and details of the invention as shown and described may be made. It is intended that such changes be included within the spirit and scope of the claims appended hereto.

What is claimed is:

1. A system for providing information from which a three dimensional configuration of an object may be determined, comprising means for projecting a scanning beam which is reflected by the object, means for scanning the analyzing beam in a plurality of repetitive lines in a first direction, means for moving the scanning means relative to the object in a second direction which is at an angle to the first direction, a one dimensional means for sensing the reflected scanning beam aligned to receive repetitive lines of the scanning beam reflected from the object, means for supplying information from the plurality of lines as outputs and means for analyzing the output to provide signals representative of said information, said output analyzing means including a means for forming a three dimensional model of the object, configured to form the model as a plurality of surfaces and a means for locating and measuring a desired portion of the object in the three dimensional model.

2. The system of claim 1 further comprising memory means connected for storage and retrieval of information signal outputs from said system.

3. The system of claim 1 further comprising a control panel allowing manual control of the said system.

4. The system of claim 1 further comprising means for carrying out operations to change the object, said means for carrying out operations being connected to receive control signals derived from an output of said means for locating and measuring the desired portion of the object.

5. The system of claim 4 in which the means for carrying out operations to change the object includes a welding head.

6. The system of claim 5 in which said scanning means is provided in a housing having at least one faceplate admitting the scanning beam and a nozzle positioned to direct flowing gas across said faceplate.

7. The system of claim 1 in which said beam projecting means includes a light source, a scanning mirror for causing a beam of light from said light source to scan the object, and said sensing means is a linear diode array, said scanning mirror also being positioned to project light from said beam projecting means which is reflected from the object to diodes in said linear diode array.

8. The system of claim 1 in which said means for forming a three dimensional model is configured to form the three dimensional model as a plurality of planes.

9. The system of claim 8 in which said means for locating and measuring the desired portion of the object is configured to locate and measure a welding seam.

10. The system of claim 8 in which said means for forming a three dimensional model is configured to establish the plurality of planes by selecting three data points to form a first seed plane triangle, then testing data points interior to the first triangle to determine if they lie on the seed plane formed by the first triangle.

11. The system of claim 10 in which said means for forming a three dimensional model is configured to subdivide said first seed plane triangle into a plurality of smaller triangles if the data points do not lie on the seed plane formed by the first triangle, then test a plurality of data points interior to the plurality of smaller triangles to see if they lie on the seed planes formed by the plurality of smaller triangles.

12. The system of claim 10 in which said means for forming a three dimensional model configured to extend the seed plane formed by the first triangle outward if the data points interior to the first triangle lie on the seed plane formed by the first triangle.

13. The system of claim 10 in which said means for forming a three dimensional model is configured to extend the seed plane formed by the first triangle outward if the data points interior to the first triangle lie on the seed plane formed by the first triangle.

14. A system for providing information from which a three dimensional configuration of an object may be determined, comprising means for projecting an analyzing beam which is reflected by the object, means for scanning the analyzing beam in a plurality of repetitive lines in a first direction, means for moving the scanning means relative to the object in a second direction which is at an angle to the first direction, a one dimensional means for sensing the reflected scanning beam aligned to receive repetitive lines of the scanning beam reflected from the object, means for supplying information from the plurality of lines as outputs and means for analyzing the output to provide signals representative of said information, said output analyzing means including a means for forming a surface model of the object and a means for locating and measuring a desired portion of the object in the surface model, said means for locating and measuring the desired portion of the object being configured to process the data in line scans of said scanning means into a plurality of nodes, each representing an object surface in the surface model, and at least one line connecting adjacent nodes, representing an edge joining adjacent surfaces.

15. The system of claim 14 in which said means for locating and measuring the desired portion of the object is configured to reduce the plurality of nodes and the at least one edge to a predetermined combination representing one of a plurality of potential object types by application of a set of node and edge reduction rules unique to each object type.

* * * * *